(12) United States Patent
Tomov et al.

(10) Patent No.: US 11,920,606 B2
(45) Date of Patent: Mar. 5, 2024

(54) AIRCRAFT ENGINE FUEL PUMP

(71) Applicant: SAFRAN AIRCRAFT ENGINES, Paris (FR)

(72) Inventors: Petar Dimitrov Tomov, Moissy-Cramayel (FR); Loïc Pora, Moissy-Cramayel (FR); Sébastien Christophe Loval, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/006,100

(22) PCT Filed: Jul. 16, 2021

(86) PCT No.: PCT/FR2021/051338
§ 371 (c)(1),
(2) Date: Jan. 19, 2023

(87) PCT Pub. No.: WO2022/018368
PCT Pub. Date: Jan. 27, 2022

(65) Prior Publication Data
US 2023/0279867 A1 Sep. 7, 2023

(30) Foreign Application Priority Data

Jul. 24, 2020 (FR) .................................. 2007836

(51) Int. Cl.
F04D 29/22 (2006.01)
F02K 9/46 (2006.01)
F04D 7/02 (2006.01)

(52) U.S. Cl.
CPC ............ F04D 29/2266 (2013.01); F02K 9/46 (2013.01); F04D 7/02 (2013.01)

(58) Field of Classification Search
CPC ...... F04D 7/02; F04D 29/041; F04D 29/2266; F04D 29/2277; F02K 9/46
See application file for complete search history.

(56) References Cited

U.S. PATENT DOCUMENTS 3,677,659 A * 7/1972 Williams .............. F04D 29/049
415/58.4
6,361,270 B1 * 3/2002 Bennett ................... F04D 17/12
416/185
(Continued)

FOREIGN PATENT DOCUMENTS

EP       1988292 A1    11/2008

OTHER PUBLICATIONS

International Search Report issued in International Application No. PCT/FR2021/051338, dated Oct. 25, 2021 (5 pages).

*Primary Examiner* — Courtney D Heinle
*Assistant Examiner* — Danielle M. Christensen
(74) *Attorney, Agent, or Firm* — Bookoff McAndrews, PLLC

(57) ABSTRACT

Fuel pump for an aircraft engine, comprising an inducer and a centrifugal impeller fixed together and having an axis of rotation, an annular space spacing axially the inducer and the impeller, and two contact portions between the inducer and the impeller disposed radially outside the annular space, a first plenum chamber and a second plenum chamber, in which the inducer and the impeller are spaced axially from each other, each being disposed between the two contact portions, the plenum chambers being symmetrical to each other with respect to the axis of rotation and in fluid communication with the annular space, the centrifugal impeller comprising a plurality of axial balancing holes distributed about the axis of rotation and opening out into the annular space at one end, and into a downstream space of the impeller at the other end.

20 Claims, 4 Drawing Sheets

(56) References Cited

U.S. PATENT DOCUMENTS

2007/0224047 A1 9/2007 Falk et al.
2008/0080965 A1 4/2008 Wahl et al.

\* cited by examiner

[Fig. 1]
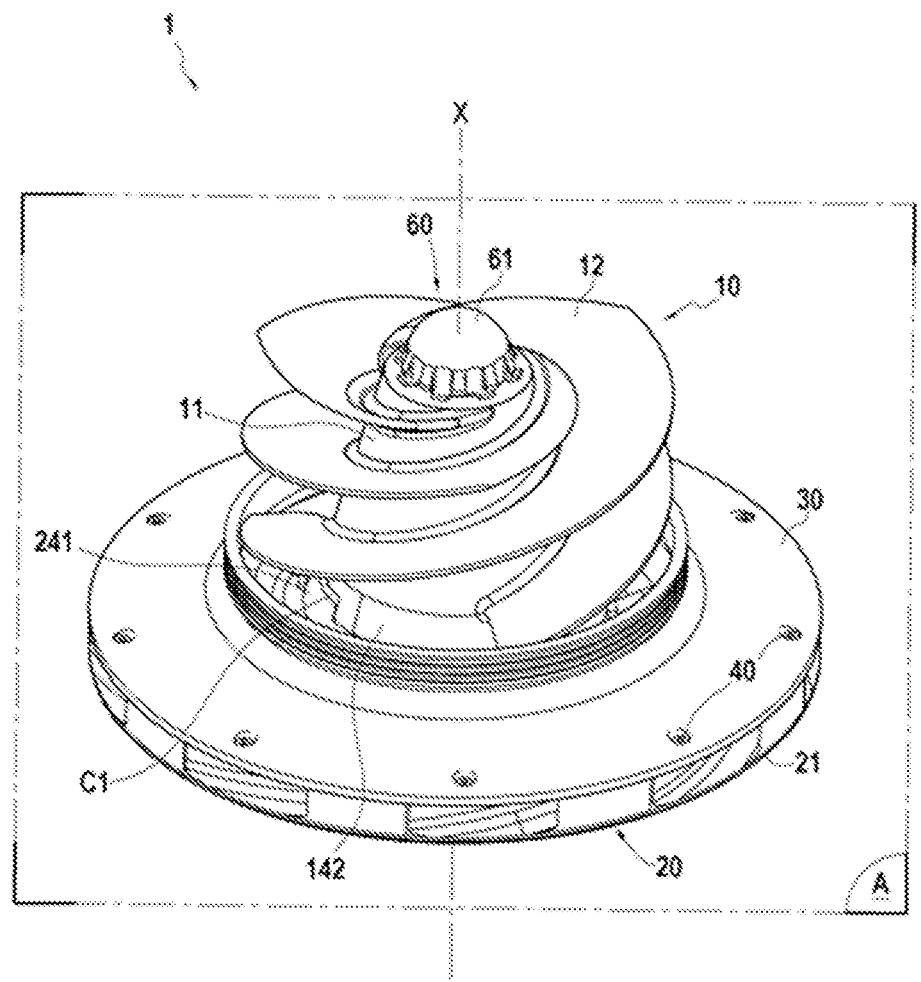

[Fig. 2]
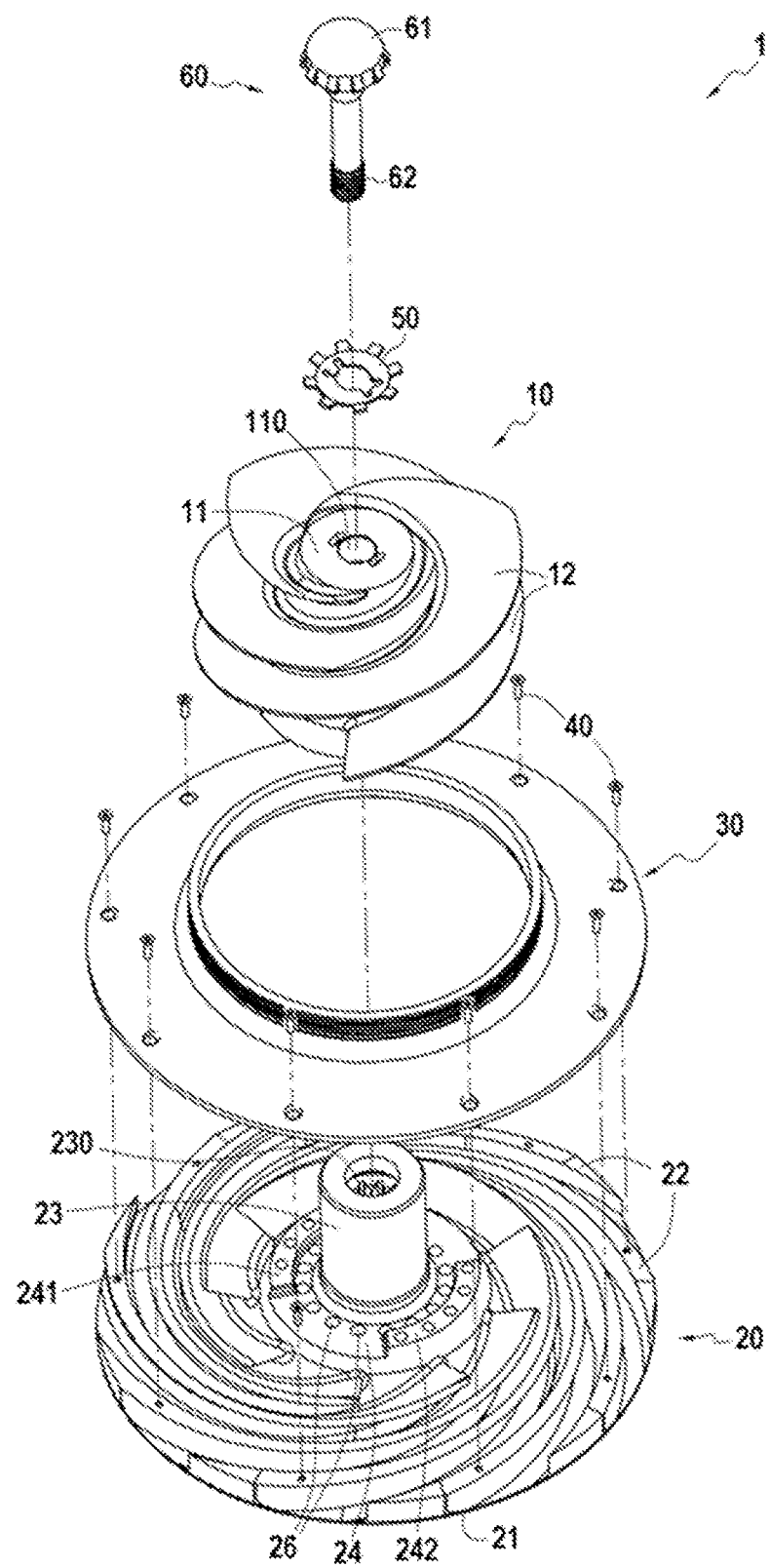

[Fig. 3]
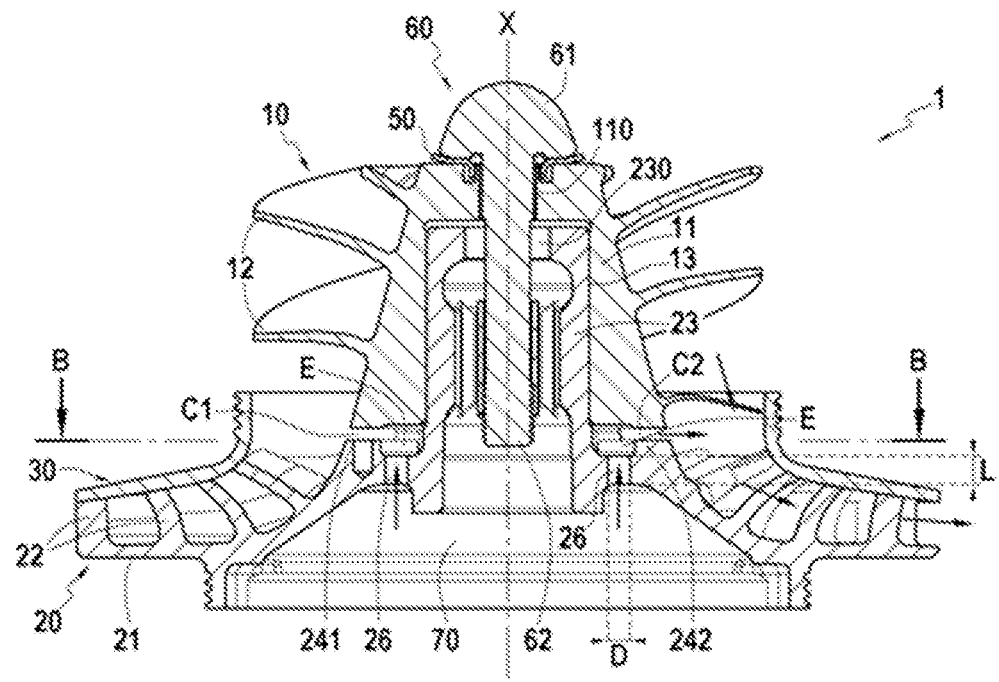
[Fig. 4]
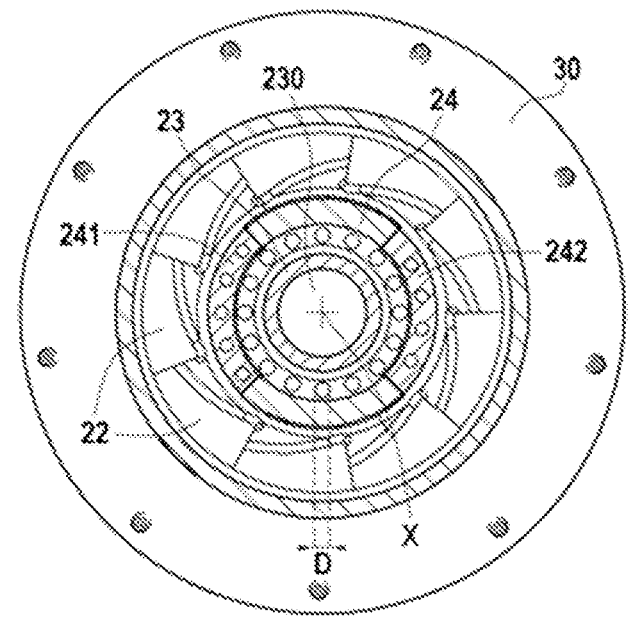

[Fig. 5]
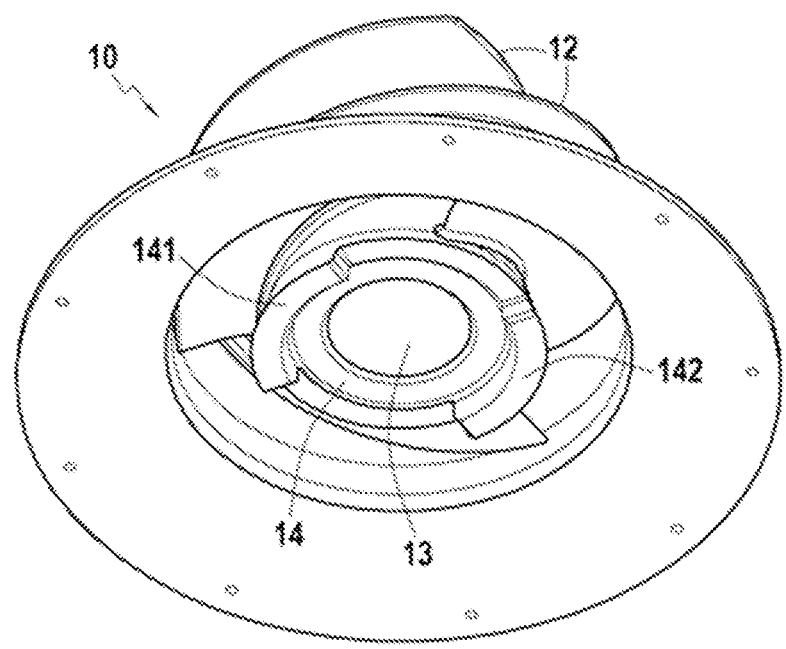
[Fig. 6]
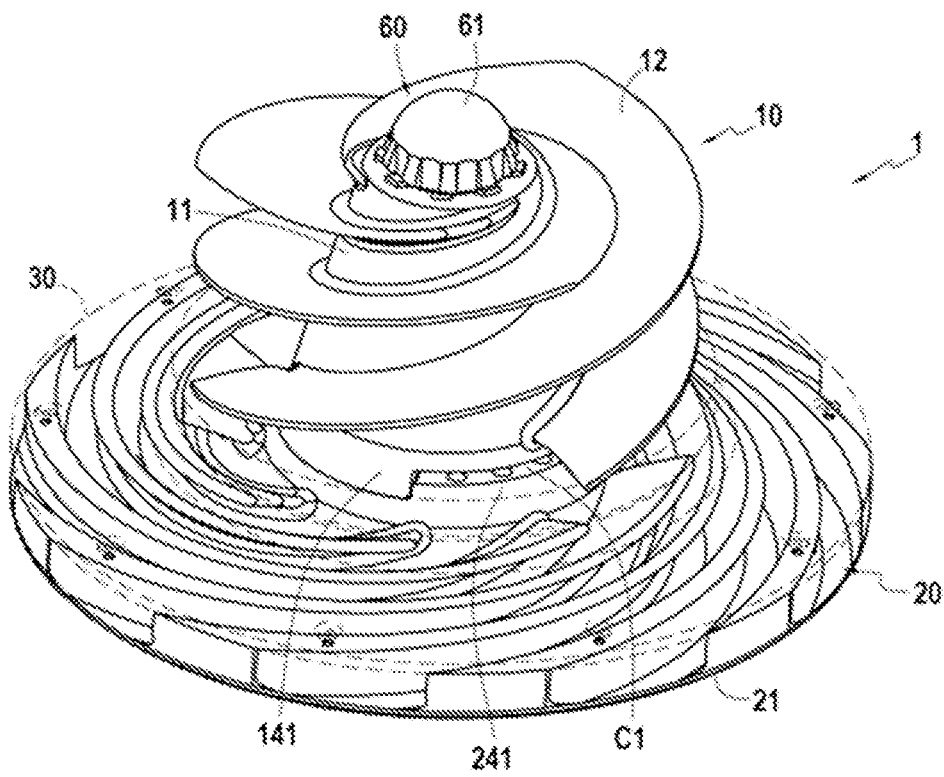

US 11,920,606 B2

AIRCRAFT ENGINE FUEL PUMP

CROSS-REFERENCE TO RELATED APPLICATIONS

This patent application is a U.S. National Stage entry of International Application No. PCT/FR2021/051338, filed on Jul. 16, 2021, now published as WO 2022/018368 A1, which claims priority to French Application No. 2007836, filed on Jul. 24, 2020.

TECHNICAL FIELD

The present disclosure relates to the technical field of fuel pumps. Particularly, the present disclosure relates to a fuel pump for an aircraft engine, and an aircraft comprising such a pump.

PRIOR ART

The fuel pump is one of the main elements for regulating an aircraft engine, in particular an airplane engine. It allows supplying fuel to the combustion chamber from the tanks of the airplane. Its flow rate and its pressure are also used to generate the hydraulic power for actuating the variable geometries of the engine.

The main pumps generally comprise a low-pressure (LP) stage and a high-pressure (HP) stage. The LP stage generally consists of an inducer and a centrifugal impeller, as well as a volute. The HP stage of a main fuel pump generally consists of an external gear pump mechanically driven by a shaft of the power gearbox of the engine.

In general, a fuel pump is dimensioned for conditions which require guaranteeing a flow rate greater than the flow rate requested flow for all the operating conditions. Currently, a centrifugal pump with an inducer and a bladed impeller followed by a volute is used in a known manner for the LP stage.

In order to guarantee the proper operation of the LP stage of the fuel pump, it is necessary to know and control the hydraulic forces generated for different operating points. These hydraulic forces can be divided into two parts: axial forces and radial forces.

It is difficult to know the axial forces, insofar as the balancing problem is directly linked to the knowledge of the pressure field at the outlet of the inducer. In case an inducer is placed in front of a centrifugal impeller, the pressure generated by the inducer is applied to the rear of the impeller. The axial forces are also related to the diameter of the inducer. The reduction of the latter allows it to be less sensitive to poorly controlled pressures. However, the control of the forces remains essential for the proper operation of the LP stage of the pump.

Thus, in order to facilitate the axial balancing of the LP stage of the fuel pump, it is known to use "open" type centrifugal impellers, not comprising an upstream flange, which have holes called "balancing holes". The purpose of these holes is to allow the fluid to pass from the high-pressure area to the low-pressure area, so as to reduce the axial forces.

However, in the case of a configuration with an inducer and a "closed" type impeller, whose blades are disposed between an upstream flange, fully covering the blades of the impeller (from the leading edge to the trailing edge), and a downstream flange, the balancing holes can be between the blades of the inducer, which makes the knowledge of the pressure field very difficult. In addition, the rotation of the impeller shears the flow, causing a significant pressure drop and varying according to the operating points. These drawbacks affect the performance of the pump.

There is therefore a need, in the case of "closed" type impellers, to overcome, at least partly, the drawbacks mentioned above.

DISCLOSURE OF THE INVENTION

The present disclosure relates to a fuel pump for an aircraft engine, comprising:
an inducer comprising an axis of rotation,
a centrifugal impeller coaxial with the inducer, the inducer being fixed to the centrifugal impeller upstream thereof so as to define an annular interface between the inducer and the impeller about the axis of rotation, the annular interface comprising an annular space spacing axially the inducer and the impeller, and two contact portions between the inducer and the impeller disposed radially outside the annular space, a first plenum chamber and a second plenum chamber, in which the inducer and the impeller are spaced axially from each other, each being disposed circumferentially between the two contact portions, the plenum chambers being symmetrical to each other with respect to the axis of rotation and in fluid communication with the annular space,
the impeller comprising a plurality of axial balancing holes distributed circumferentially about the axis of rotation and opening out into the annular space at one end, and into a downstream space of the impeller at the other end.

In some embodiments, an upstream flange is fixed to the impeller upstream thereof so as to at least partially cover the blades of the impeller.

Generally, an axial direction corresponds to the axis of rotation of the fuel pump, and a radial direction is a direction perpendicular to this axis of rotation. The circumferential direction corresponds to the direction describing a ring around the axial direction. Also, the upstream and the downstream are defined with respect to the normal flow direction of the fluid (from upstream to downstream) through the pump, with the fluid first reaching the inducer, then the impeller. Finally, unless otherwise specified, the adjectives "internal" and "external" are used in reference to a radial direction so that the internal (i.e. radially internal) part of an element is closer to the axis of rotation than the external (i.e. radially external) part of the same element.

Preferably, the impeller and the inducer each comprise an orifice coaxial with the axis of rotation. An axial fixing means is disposed through the orifices of the impeller and of the inducer respectively, making it possible to fix axially the impeller and the inducer together. For example, a threaded screw can be inserted through the orifice of the inducer and of the impeller, and screwed into a tapped hole disposed in the impeller. Furthermore, the assembly can be driven by a rotation shaft via splines, these being on the impeller. The profile of the splines can be chosen depending on the need.

Thus, when the inducer and the impeller are fixed together, an annular interface between these two parts is formed, this interface having substantially the shape of a ring surrounding the axis of rotation, in other words the axial fixing means.

The inducer and the impeller are not in contact over the entire surface of the annular interface. The annular interface comprises an annular space in which the impeller and the interface are not in contact, but are spaced from each other axially. The annular space preferably extends over the entire circumference of the interface about the axis of rotation, but not over the entire radial width of the annular interface, the surface of the annular interface also comprising contact portions.

The contact portions are disposed radially outside the annular space. In other words, the contact portions at least partially surround the annular space.

The contact surface between the inducer and the impeller is therefore discontinuous. In other words, the inducer and the impeller are not in contact with each other over the entire circumference of the interface. More specifically, the inducer and the impeller are in contact at the annular interface only via the contact portions, this contact being axial. Thus, two spaced portions, in which the inducer and the impeller are spaced axially from each other, are each formed circumferentially between the two contact portions. These spaced portions form a first and a second plenum chamber disposed radially outside the annular space, symmetrically to each other, with respect to the axis of rotation. In doing so, the contact portions are also disposed symmetrically to each other with respect to the axis of rotation.

Furthermore, the axial balancing holes are disposed in the impeller so as to pass axially therethrough, these holes being disposed radially inside the contact portions and the plenum chambers, so as to open out into the annular space.

Thus, a recirculating fluid, coming from the inducer and the impeller and returning to the space downstream of the impeller, can be reinjected into the annular space via the balancing holes. These thus allow balancing the pressures between the upstream and downstream of the impeller, and thus reducing the axial forces.

In addition, the fluid present in the annular space can be ejected radially out of this annular space via the plenum chambers. These plenum chambers allow calming the cross flow by standardizing in particular the velocity field. More specifically, the plenum chambers allow limiting the turbulence and the shear of the fluid passing through the balancing holes, generated by the rotation of the impeller, before the fluid reaches the downstream region of the inducer.

Calming this cross flow before it joins the main flow leaving the inducer allows reducing the impact of this cross flow on the pressure field, and consequently on the velocity field between the inducer and the centrifugal impeller.

In addition, the symmetrical disposition of the plenum chambers allows standardizing the pressure of the fluid escaping through these chambers, thus further limiting the impact on the main flow, i.e. the fluid flowing from upstream to downstream between the inducer and the impeller.

In some embodiments, the first and second plenum chambers each extend circumferentially over at least a quarter of the circumference of the annular interface.

This configuration allows maximizing the calming effect of the fluid leaving the balancing holes and ejected radially to the outside of the impeller, while maintaining a sufficient contact surface between the inducer and the impeller allowing good structural stability of the assembly.

In some embodiments, the inducer comprises a first annular surface comprising two first raised portions protruding axially with respect to the rest of the first annular surface, the first raised portions being symmetrical to each other with respect to the axis of rotation and being in contact with a second annular surface of the impeller, when the impeller and the inducer are fixed together.

The contact between the first raised portions of the inducer and the second annular surface of the impeller correspond to the contact portions, and thus form a discontinuous annular contact surface between the inducer and the impeller.

In some embodiments, the second annular surface of the impeller comprises two second raised portions protruding axially with respect to the rest of the second annular surface, the second raised portions being symmetrical to each other with respect to the axis of rotation and being disposed circumferentially between the first raised portions when the impeller and the inducer are fixed together.

In other words, the first raised portions form therebetween two gaps in each of which a second raised portion is disposed, and the second raised portions also form therebetween two gaps in each of which a first raised portion is disposed. The first and second raised portions are thus nested inside each other. This configuration allows limiting a relative circumferential displacement of the inducer with respect to the impeller about the axis of rotation.

Preferably, a length of the arc formed by each first raised portion is substantially equal to a length of the gap between two second raised portions. Similarly, a length of the arc formed by each second raised portion is substantially equal to a length of the gap between two first raised portions. This configuration allows further limiting a relative circumferential displacement of the inducer with respect to the impeller about the axis of rotation.

In some embodiments, a height of the first raised portions is greater than a height of the second raised portions, such that the first raised portions are in contact with the second annular surface of the impeller, and such that the second raised portions are not in contact with the first annular surface of the inducer.

According to this configuration, when the inducer and the impeller are fixed to each other, the first raised portions of the inducer abut against the second annular surface of the impeller, but a space remains between the second raised portions of the impeller and the first annular surface of the inducer. These spaces form the first and second plenum chambers. The implementation of these plenum chambers is thus simple to make and inexpensive.

Alternatively, in some embodiments, a height of the second raised portions is greater than a height of the first raised portions, such that the second raised portions are in contact with the first annular surface of the inducer, and such that the first raised portions are not in contact with the second annular surface of the impeller.

In some embodiments, the balancing holes are distributed circumferentially at regular intervals about the axis of rotation.

This configuration allows standardizing the distribution of the recirculating fluid traveling back from the space downstream of the impeller to the upstream of the impeller, thus making it possible to improve the efficiency of the balancing of the pressures between the upstream and the downstream of the impeller.

In some embodiments, the centrifugal impeller comprises sixteen axial balancing holes.

The presence of sixteen balancing holes allows transferring a large volume of recirculating fluid from downstream to upstream of the impeller, thus improving the balancing of the pressures between the upstream and the downstream of the impeller.

In some embodiments, a distance between the balancing holes and the main axis is less than 20%, preferably less than 15%, more preferably less than 10% of the radius of the impeller.

The fact of disposing the balancing holes as close as possible to the axis of rotation, and therefore as far as possible from the main flow of fluid leaving the inducer allows reducing the shearing effect of the fluid leaving the balancing holes on this main flow. This allows reducing the pressure drops, and thus improving the performance of the pump.

In some embodiments, a ratio L/D between a length L and a diameter D of the balancing holes is greater than or equal to 2.

Particularly, values of this ratio greater than or equal to 2 allow obtaining a discharge coefficient substantially constant and equal to 0.8, making it possible to maximize the volume of fluid transferred from the downstream space of the impeller to the upstream of the impeller, while minimizing the pressure drops.

The present disclosure also relates to an aircraft comprising the pump according to any one of the preceding embodiments.

The aircraft can be in particular an airplane or a helicopter.

BRIEF DESCRIPTION OF THE DRAWINGS

The invention and its advantages will be better understood upon reading the detailed description given below of various embodiments of the invention given by way of non-limiting examples. This description refers to the pages of appended figures, on which:

FIG. 1 is a perspective view of a fuel pump according to one embodiment of the present disclosure, FIG. 2 is an exploded view of the fuel pump of FIG. 1, FIG. 3 represents a sectional view, along a section plane A of the centrifugal pump of FIG. 1, FIG. 4 represents a top view of the centrifugal impeller of the centrifugal pump of FIG. 3, in the plane B-B, FIG. 5 represents a perspective bottom view of an inducer of the fuel pump of FIG. 1, FIG. 6 represents a perspective view of a fuel pump according to one embodiment of the present disclosure in which the upstream flange is hidden and a plenum chamber is visible.

DESCRIPTION OF THE EMBODIMENTS

A fuel pump according to one embodiment of the invention will be described in the following description with reference to FIGS. 1 to 6.

FIG. 1 represents a perspective view of an example of a fuel pump 1. More specifically, it represents a low-pressure stage of such a pump, extending about an axis of rotation X and able to rotate about this axis. The environment of this assembly (volute, high-pressure stage, etc.) is not represented.

This low-pressure stage comprises an inducer 10 and a centrifugal impeller 20 fixed to the inducer 10, downstream thereof.

The inducer 10 comprises a tubular hub 11, from which a plurality of blades 12 extend radially. An upstream end of the hub 10 comprises an orifice 110, through which a fixing means, for example a threaded screw 60, is inserted.

The centrifugal impeller 20 comprises a main body 21, from which a plurality of blades 22 extend axially upstream and radially outwards. The impeller 20 comprises in its central part a tubular portion 23 intended to be inserted inside a cavity 13 formed inside the tubular hub 11 of the inducer 10, thus creating a cylindrical contact surface between the inducer 10 and the impeller 20. In addition, the tubular portion 23 of the impeller 20 comprises at its center an orifice 230 disposed coaxially with the orifice 110 of the hub 11 of the inducer 10, the orifices 110 and 230 being themselves coaxial with the axis of rotation X. The orifice 230 is also configured to receive the threaded screw 60. A radially outer face of the downstream end of the impeller 20 can comprise labyrinth seals, making it possible to ensure the sealing between the downstream end of the impeller 20 and a casing of the pump (not illustrated).

More specifically, the threaded screw 60 comprises a screw head 61 bearing against the upstream end of the hub 11, a bearing washer 50 being interposed between the screw head 61 and said upstream end. A downstream end of the rod of the screw 60 is disposed in the tubular portion 23 of the impeller 20, and comprises a threaded portion 62, configured to be screwed with a tapped portion disposed in the said tubular portion 23. The inducer 10 and the centrifugal impeller 20 are thus fixed axially to each other. The assembly can be driven by a rotation shaft via splines (not visible in the figures).

An upstream flange 30 is also fixed to the centrifugal impeller 20 upstream thereof, by means of a plurality of screws 40. This upstream flange 30 allows at least partially covering the blades 22 of the impeller 20, thus forming a closed enclosure between said flange 30 and the main body 21 of the impeller 20. By "closed", it is understood that the blades 22 of the impeller 20 are enclosed axially at least partially between the flange 30 and the main body 21, and thus at least partially isolated from the upstream and the downstream of the impeller 20, by the flange 30 and the main body 21 respectively. A radially outer end of the flange 30 can also comprise labyrinth seals, making it possible to ensure the sealing between the flange 30 and a casing of the pump (not illustrated).

In addition to the cylindrical interface mentioned above, an annular interface exists between the inducer 10 and the centrifugal impeller 20 when these two parts are fixed together.

More specifically, the inducer 10 comprises a first annular surface 14 formed at the downstream end of the hub 11 of the inducer 10, and surrounding the end of the cavity 13. Similarly, the centrifugal impeller 20 comprises a second annular surface 24 formed at the upstream end of the main body 21 of the impeller 20 and surrounding the tubular portion 23. When the inducer 10 and the impeller 20 are fixed with each other, the first annular surface 14 and the second annular surface 24 are opposite each other along the axial direction. Some portions of these surfaces 14, 24 are contact with each other, and other portions of these surfaces are spaced from each other, as described below.

The first annular surface 14 of the inducer 10 comprises two first raised portions 141, 142, extending axially with respect to the rest of the first annular surface 14. These raised portions have the form of arc-shaped crenellations protruding from the rest of the first annular surface 14, and extending circumferentially, and axisymmetrically with respect to the central axis X, but over only part of the circumference of the first annular surface 14. The first raised portions 141, 142 each form an arc of a circle of dimension substantially equal to a quarter of the total circumference of the first annular surface 14. In addition, the first raised portions 141, 142 are disposed symmetrically to each other, with respect to the central axis X. In the example illustrated in FIG. 5, the portions of the first annular surface 14, other than the raised portions 141, 142, are represented on two different levels. This example is however not limiting, this surface can be uniform. It will also be noted that the raised portions 141, 142 do not extend radially over the entire width of the first annular surface 14, but are disposed at an outer radial end thereof, so as to leave a space between these raised portions 141, 142, and the cavity 13. This space allows creating the annular space E described later, when the inducer is fixed to the impeller 20.

The second annular surface 24 of the centrifugal impeller 20 comprises two second raised portions 241, 242, extending axially with respect to the rest of the second annular surface 24. The second raised portions 241, 242 have substantially the same characteristics as the first raised portions 141, 142, and will not be described again. However, the second raised portions 241, 242 differ from the first raised portions 141, 142 in that their dimension along the axial direction is smaller. In other words, the second raised portions 241, 242 protrude axially upstream over a distance smaller than the distance on which the first raised portions 141, 142 protrude axially downstream.

Thus, when the inducer 10 and the impeller 20 are fixed with each other, the first raised portions 141, 142, inserted respectively between the two second raised portions 241, 242, come into abutment against the second annular surface 24 of the impeller 20, thus forming a discontinuous annular contact surface about the axis of rotation X. Conversely, a space remains between the second raised portions 241, 242, inserted respectively between the two first raised portions 141, 142, and the first annular surface 14. The two spaces thus created form a first plenum chamber C1 and a second plenum chamber C2, of identical shape and dimensions, and disposed symmetrically to each other with respect to the axis of rotation X.

This example is however not limiting, the second raised portions 241, 242 can alternatively be axially longer than the first raised portions 141, 142, also making it possible to obtain two plenum chambers C1 and C2.

Furthermore, the portion of the first annular surface 14 disposed radially inside the first raised portions 141, 142 forms, with the portion of the second annular surface 24 disposed radially inside the second raised portions 241, 242, an annular space E, when the inducer 10 and the impeller 20 are fixed together. This annular space E is disposed radially inside the first raised portions 141, 142, the second raised portions 241, 242 and the plenum chambers C1, C2, and surrounds the tubular portion 23 of the impeller 20, over the entire circumference thereof. The axial thickness of this annular space E is greater than the axial thickness of the plenum chambers C1 and C2.

The centrifugal impeller 20 further comprises a plurality of balancing holes 16, distributed circumferentially and at regular intervals about the axis of rotation X. These orifices are disposed radially between the second raised portions 241, 242 and the tubular portion 13. They extend axially through the entire thickness of the main body 21 of the impeller 20, over a length L, such that a first end of each of these holes 26 opens out into a downstream space 70, downstream of the impeller 20, and a second end opens out into the annular space E. The balancing holes 16 have a diameter D, determined such that the ratio L/D is greater than or equal to 2. According to this embodiment, the impeller 20 comprises sixteen balancing holes 26. This example is however not limiting, and can be adapted according to the dimensions of the impeller 20.

FIG. 3 illustrates the path followed by the fluid, for example a liquid, flowing in the centrifugal pump 1 (see black arrows in FIG. 3). The fluid flows first in the inducer 10 and then in the centrifugal impeller 20. The flow along the inducer 10 and the impeller 20 is the main flow. The fluid is then discharged in a volute (not represented). A portion of this fluid, called "recirculating fluid", can also travel back up to the downstream space 70. This fluid can then be transferred from this downstream space 70 to the annular space E via the balancing holes 26, then ejected radially from this annular space E towards the main flow, at the level of the outlet of the inducer 10, passing through the plenum chambers C1 and C2. The passage of the fluid through these plenum chambers C1 and C2 allows calming this cross flow, thus limiting the shear effect generated on the main flow. It will be noted that a portion of the fluid (not represented) leaving the impeller 20 can also travel back from the impeller 20 to the inducer 10, along the outer wall of the flange 30. This portion is subsequently sucked by the inducer 10 and the impeller 20, in the main flow.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

The invention claimed is:

1. A fuel pump for an aircraft engine, comprising:
an inducer comprising an axis of rotation;
a centrifugal impeller coaxial with the inducer, the inducer being fixed to the centrifugal impeller upstream thereof so as to define an annular interface between the inducer and the centrifugal impeller about the axis of rotation, the annular interface comprising an annular space spacing axially the inducer and the centrifugal impeller, and two contact portions between the inducer and the centrifugal impeller disposed radially outside the annular spaced; and
a first plenum chamber and a second plenum chamber, in which the inducer and the centrifugal impeller are spaced axially from each other, each being disposed circumferentially between the two contact portions, the plenum chambers being symmetrical to each other with respect to the axis of rotation and in fluid communication with the annular space, the centrifugal impeller comprising a plurality of axial balancing holes distributed circumferentially about the axis of rotation and opening out into the annular space at one end, and into a downstream space of the centrifugal impeller at the other end.

2. The fuel pump according to claim 1, wherein the first and second plenum chambers each extend circumferentially over at least a quarter of the circumference of the annular interface.

3. The fuel pump according to claim 2, wherein the inducer comprises a first annular surface comprising two first raised portions protruding axially with respect to the rest of the first annular surface, the first raised portions being symmetrical to each other with respect to the axis of rotation and being in contact with a second annular surface of the impeller, when the impeller and the inducer are fixed together.

4. The fuel pump according to claim 2, wherein the balancing holes are distributed circumferentially at regular intervals about the axis of rotation.

5. The fuel pump according to claim 2, wherein the centrifugal impeller comprises sixteen axial balancing holes.

6. The fuel pump according to claim 1, wherein the inducer comprises a first annular surface comprising two first raised portions protruding axially with respect to the rest of the first annular surface, the first raised portions being symmetrical to each other with respect to the axis of rotation and being in contact with a second annular surface of the impeller, when the impeller and the inducer are fixed together.

7. The fuel pump according to claim 6, wherein the second annular surface of the impeller comprises two second raised portions protruding axially with respect to the rest of the second annular surface, the second raised portions being symmetrical to each other with respect to the axis of rotation and being disposed circumferentially between the first raised portions when the impeller and the inducer are fixed together.

8. The fuel pump according to claim 7, wherein a height of the first raised portions is greater than a height of the second raised portions, such that the first raised portions are in contact with the second annular surface of the impeller, and such that the second raised portions are not in contact with the first annular surface of the inducer.

9. The fuel pump according to claim 8, wherein the balancing holes are distributed circumferentially at regular intervals about the axis of rotation.

10. The fuel pump according to claim 7, wherein the balancing holes are distributed circumferentially at regular intervals about the axis of rotation.

11. The fuel pump according to claim 7, wherein the centrifugal impeller comprises sixteen axial balancing holes.

12. The fuel pump according to claim 6, wherein the balancing holes are distributed circumferentially at regular intervals about the axis of rotation.

13. The fuel pump according to claim 6, wherein the centrifugal impeller comprises sixteen axial balancing holes.

14. The fuel pump according to claim 1, wherein the balancing holes are distributed circumferentially at regular intervals about the axis of rotation.

15. The fuel pump according to claim 1, wherein the centrifugal impeller comprises sixteen axial balancing holes.

16. The fuel pump according to claim 1, wherein a distance between the balancing holes and the axis of rotation is less than 20% of the radius of the impeller.

17. The fuel pump according to claim 1, wherein a ratio L/D between a length L and a diameter D of the balancing holes is greater than or equal to 2.

18. An aircraft comprising the fuel pump according to claim 1.

19. The fuel pump according to claim 1, wherein a distance between the balancing holes and the axis of rotation is less than 15% of the radius of the impeller.

20. The fuel pump according to claim 1, wherein a distance between the balancing holes and the axis of rotation is less than 10% of the radius of the impeller.

* * * * *